May 24, 1932. D. ADAMS 1,860,067
APPARATUS FOR PRODUCING LAMINATED GLASS
Filed Feb. 20, 1928 6 Sheets-Sheet 1

Inventor
Daniel Adams.
By Frank Fraser
Attorney

May 24, 1932.　　　　D. ADAMS　　　　1,860,067
APPARATUS FOR PRODUCING LAMINATED GLASS
Filed Feb. 20, 1928　　6 Sheets-Sheet 2

Inventor
Daniel Adams.
By Frank Fraser,
Attorney

May 24, 1932. D. ADAMS 1,860,067
APPARATUS FOR PRODUCING LAMINATED GLASS
Filed Feb. 20, 1928  6 Sheets-Sheet 3

Inventor
Daniel Adams.
By Frank Fraser
Attorney

May 24, 1932.  D. ADAMS  1,860,067
APPARATUS FOR PRODUCING LAMINATED GLASS
Filed Feb. 20, 1928   6 Sheets-Sheet 4

Inventor
Daniel Adams.
By Frank Fraser,
Attorney

May 24, 1932.  D. ADAMS  1,860,067
APPARATUS FOR PRODUCING LAMINATED GLASS
Filed Feb. 20, 1928   6 Sheets-Sheet 5

Inventor
Daniel Adams.
By Frank Fraser,
Attorney

May 24, 1932.　　　　D. ADAMS　　　　1,860,067
APPARATUS FOR PRODUCING LAMINATED GLASS
Filed Feb. 20, 1928　　6 Sheets-Sheet 6

Inventor
Daniel Adams.
By Frank Fraser,
Attorney

Patented May 24, 1932

1,860,067

UNITED STATES PATENT OFFICE

DANIEL ADAMS, OF ANN ARBOR, MICHIGAN, ASSIGNOR TO LIBBEY-OWENS-FORD GLASS COMPANY, OF TOLEDO, OHIO, A CORPORATION OF OHIO

APPARATUS FOR PRODUCING LAMINATED GLASS

Application filed February 20, 1928. Serial No. 255,593.

This invention relates to improved apparatus for making composite or laminated glass and also to a method of manufacture.

Composite or laminated glass ordinarily comprises two sheets of glass with a sheet of non-brittle material such as celluloid or cellulose composition material interposed therebetween. Of course, a greater or less number of sheets or layers of material may be employed as desired and laminated glass properly produced may possess either non-shatterable or bullet-proof qualities dependent usually upon the number of layers of material used in the manufacture thereof. The glass sheets and interposed layer or layers of non-brittle material are preferably assembled in superimposed relation with a coating of some suitable cement or bonding material applied to the adjacent faces thereof, heat being then applied to the assembled sheets in a manner serving to soften the bonding material and secure adhesion of the sheets when pressure is applied thereto.

The present apparatus is designed to provide a more convenient means for carrying out the above procedure so that the labor involved is less and the time required is reduced. Thus, an object of the invention is to simplify, expedite, render more efficient and improve generally the production of glass of this character. Another object is the provision of improved apparatus whereby the assembled layers of material to be joined may be placed therein and the finished composite sheet removed therefrom without the necessity of disassembling any part of the apparatus or otherwise disturbing the same. This can be accomplished either by the provision of a pair or plurality of pairs of diaphragms between which the assembled sheets or sets of plates to be joined are placed or by the utilization of a flexible container or bag open at one or both ends thereof.

In one aspect the invention provides a novel method or mode of procedure for positioning the assembled sheets or sets of plates to be united between the diaphragms and for subsequently removing the finished composite sheet or sheets therefrom after the several plates have been properly joined to form a unitary structure. As herein exemplified, the method consists in placing the assembled sheets between the diaphragms by inserting them therebetween from one end of the apparatus and subsequently removing them from the opposite end after the uniting or joining operation.

In another aspect, the invention consists in employing a flexible container or bag arranged within a pressure chamber, one end thereof being open at all times so that the layers of material to be joined may be inserted therein or the finished composite sheet removed therefrom in an easy and convenient manner.

Another feature of the invention consists in providing for either a single or a multiple pressing and heating operation whereby either one or a plurality of composite sheets may be simultaneously produced. The invention embodies means for circulating liquid in a heated condition and at different pressures both above and beneath the diaphragms or resilient container whereby heated liquid may be circulated for a required period of time to soften the bonding material after which the liquid may be circulated under pressure, thereby acting upon the diaphragms or container and the contents thereof to secure adhesion and effect the union of the assembled layers of material.

The apparatus also embodies novel means for opening and closing the opposite ends of the chamber containing the layers of material simultaneously and in the provision of means for automatically relieving the pressure upon the diaphragms when the ends of said chamber are opened so that any danger resulting from a fracture of the diaphragms may be minimized if not entirely eliminated.

Other objects and advantages of the invention will become more apparent during the course of the following description when taken in connection with the accompanying drawings.

In the drawings forming a part of this application and wherein like numerals are employed to designate like parts throughout the same.

Referring now to the accompanying drawings, special reference being had first to Figs. 1 to 7 inclusive, the letter A designates in its entirety the housing or casing which is adapted to receive therein the several laminations or superimposed layers of material to be united. This housing is preferably substantially rectangular both in top plan and vertical section and is composed of the upper and lower sections or members 10 and 11 respectively secured together along their side edges by means of bolts or the like 12 passing vertically therethrough. The two sections, which are coincident in both length and width and also preferably of the same depth, are held slightly spaced from one another by means of the spacing strips 13. These strips extend only along the opposite sides of the sections and receive the securing bolts 12 therethrough. It will be noted that neither the spacing strips 13 nor the securing bolts 12 are arranged at either the forward end or the rear end of the housing so that there is created at the said front and rear ends of the housing the unobstructed slots 14 and 15 respectively extending transversely throughout substantially the entire width thereof. The assembled sheets or layers of material to be joined are adapted to be inserted within the housing through the slot 14 at the forward end thereof and after being properly united or welded together to form a composite sheet, they are adapted to be removed from the opposite or rear end of said housing through slot 15 as will be more fully hereinafter described.

Figure 2:
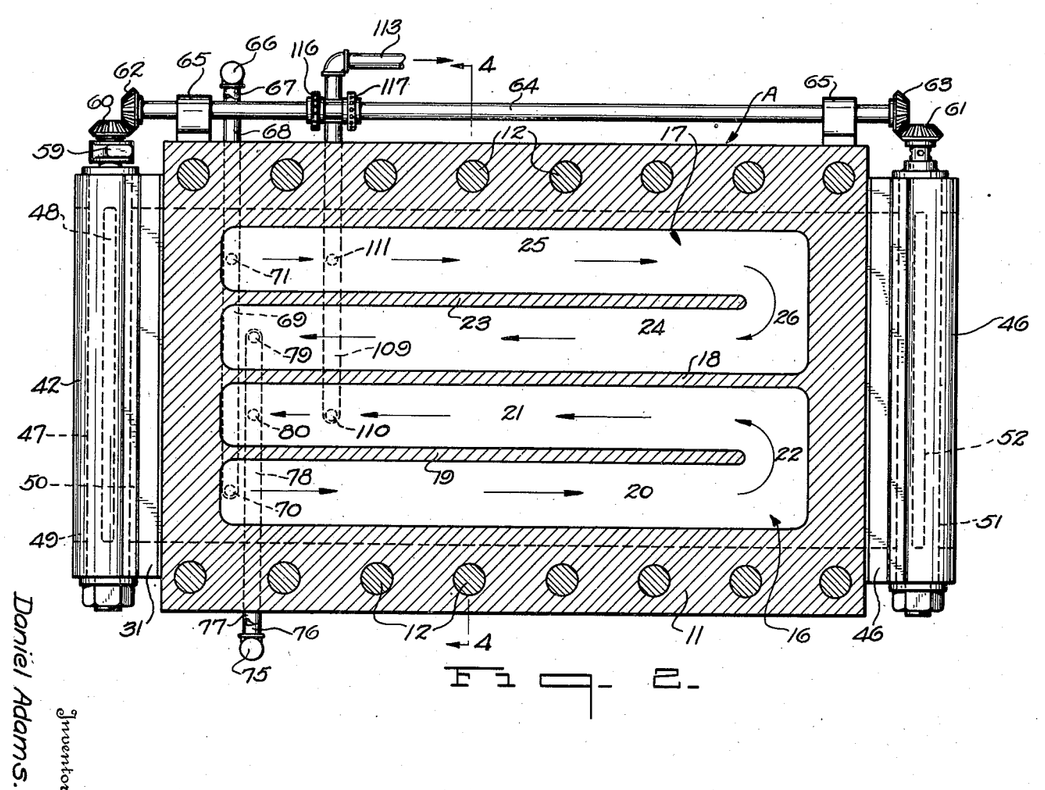
Fig. 2 is a horizontal transverse section through the housing.

As shown particularly in Fig. 2 the lower section or member 11 of housing A is provided or formed with a pair of longitudinally extending pressure chambers 16 and 17 separated by means of the vertical longitudinally extending rib 18. The pressure chamber 16 is further divided longitudinally by means of a rib 19 into separable parallel compartments 20 and 21. Since the rib 19 does not extend the entire length of chamber 16, the two compartments 20 and 21 thereof are in communication at one end as at 22. The pressure chamber 17 is likewise similarly divided by means of a rib or wall 23 into separable compartments 24 and 25 communicating with one another at the end 26. The upper section 10 of housing A is formed in the same manner and the said upper and lower sections 10 and 11 are arranged in opposition to one another so that the pressure chambers in the said upper and lower sections face one another and are correspondingly positioned.

Figure 1:
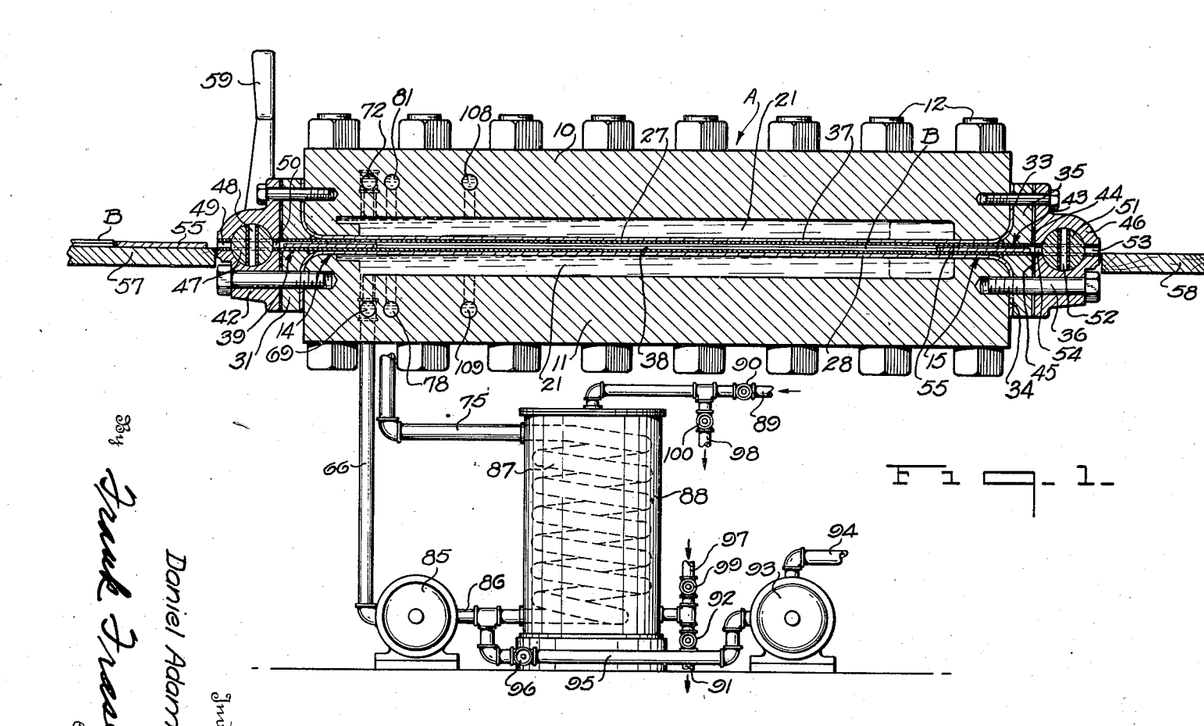
Fig. 1 is a vertical longitudinal section through apparatus constructed in accordance with the present invention, the pressure supplying means being shown in elevation.

A pair of preferably metallic diaphragms 27 and 28 are seated across the open faces of said pressure chambers and form closures therefor. Thus, the diaphragm 27 constitutes the bottom wall of the pressure chambers in the upper section 10 while the diaphragm 28 constitutes the top wall of the pressure chambers in the lower section 11. The diaphragms 27 and 28 are clamped along their opposite side edges between the spacing strips 13 and the upper and lower sections 10 and 11 of housing A and are thus held spaced from one another preferably a distance sufficient to allow the superimposed sheets or assembled layers of material to be joined to be placed therebetween. The forward end portions 29 and 30 of the metallic diaphragms 27 and 28 respectively extend through the slot 14 in the front wall of housing A and are turned laterally in opposite directions and clamped between the said housing and the transversely extending clamping plate 31 secured in place by means of bolts or the like 32, said bolts being threaded or otherwise secured within openings tapped in the adjacent end of the housing. The opposite or rear end portions 33 and 34 of the metallic diaphragms 27 and 28 respectively are likewise extended through the slot 15 in the opposite or rear end wall of the housing and are clamped in a manner similar to the forward end portions by means of the clamping plate 35 secured in place by bolts or the like 36.

The inner adjacent faces of the metallic diaphragms 27 and 28 are preferably faced or lined with the membranes 37 and 38 formed of rubber, rubber composition or any other suitable material. These membranes may or may not be permanently secured to the metallic diaphragms as desired. The clamping plate 31 at the forward end of housing A has formed therein a slot 39 extending transversely of said housing and placed in alignment with the slot 14 in the front wall thereof. The adjacent forward end portions of the membranes 37 and 38 are extended through this slot and are then turned laterally in opposite directions and clamped as at 40 and 41 between the clamping plate 31 and the valve member 42 which may also be secured in place by the bolts 32.

The clamping plate 35 at the opposite or rear end of housing A is also provided with an unobstructed transversely extending slot 43 registering with the slot 15 in the adjacent end wall thereof. The adjacent rear end portions of the membranes 37 and 38 extend through this slot and are clamped between the plate 35 and the valve member 46 as at 44 and 45, said valve member being also secured to the housing by the bolts 36. Thus, the membranes also serve as a lining for the walls of slots 39 and 43 in clamping plates 31 and 35 respectively.

The valve member 42 at the forward end of housing A extends transversely substantially the entire width thereof as shown in Fig. 2 and is provided with a longitudinally extending rotatable cylindrical core or valve element 47, said core having an unobstructed slot 48 passing transversely therethrough and extending throughout substantially the length thereof. The length of slot 48 is, as shown in Fig. 2, substantially equal to the combined widths of pressure chambers 16 and 17. Upon rotation of the core 47 the slot 48 therein is adapted to be brought into registry with the oppositely disposed slots 49 and 50 in the valve member 42 and these three slots 48, 49 and 50 are then adapted to align with the slots 39 and 14 in clamping plate 31 and housing A respectively to the end that a continuous unobstructed passage is provided leading into the space between the diaphragms 27 and 28 so that the superimposed sheets or assembled layers of material to be united may be inserted between the diaphragms from this end of the housing. The slot 48 in core 47 and also the slots 49 and 50 are preferably lined with rubber, rubber composition, or some other suitable material.

The construction of the valve member 46 at the opposite or rear end of the housing is similar in all respects to that of the valve member 42 and therefore also contains a cylindrical rotatable core or valve element 51 provided with a slot 52 adapted to register upon rotation thereof with the slots 53 and 54 at which time the said slots 52, 53 and 54 will be in alignment with slots 43 and 15 in the clamping plate 35 and housing A respectively so that there is also provided a continuous passage leading into the space between the diaphragms 27 and 28 from this end of the housing to the end that after the several sheets or assembled layers of material (which were placed between the diaphragms through the front end of the housing) have been properly joined together the finished composite sheet may be removed through the rear end of said housing. The slot 52 in core 51 together with slots 53 and 54 are likewise preferably lined with rubber, rubber composition or some other suitable material.

From the above, it will be seen that there is created between the spaced diaphragms 27 and 28, a chamber C for receiving the superimposed sheets or assembled layers of material to be united, the longitudinal limits of said chamber being defined by the cores 47 and 51. When these cores are rotated so that the slots therein assume a horizontal position the chamber C is open at both ends and there is provided a continuous unobstructed passage extending entirely through the housing.

As stated above, in carrying out the present invention, the assembled layers of material to be joined are adapted to be inserted within the chamber C through one end of the housing and after being properly joined are removed from said chamber through the opposite end thereof, this removal being ordinarily although not necessarily effected by the insertion of another set of sheets within said chamber. This is accomplished by first rotating the cores 47 and 51 of valve members 42 and 46 so as to bring the slots 48 and 52 into horizontal position whereupon the chamber formed between the diaphragms will be readily accessible from both ends as above described. The several sheets or assembled layers of material are then inserted within the chamber C preferably from the forward end of the housing.

Figure 5:
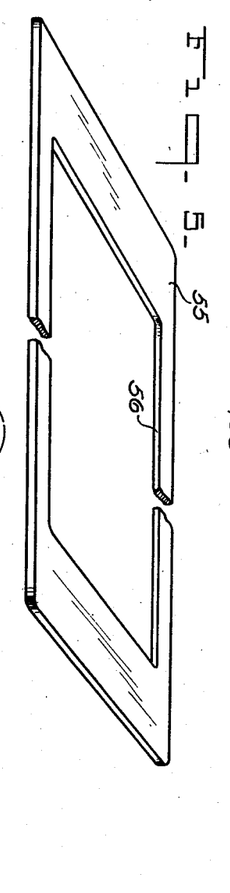
Fig. 5 is a perspective view of the frame member utilized to facilitate the insertion within and the removal of the sheets from the housing.
Figure 6:
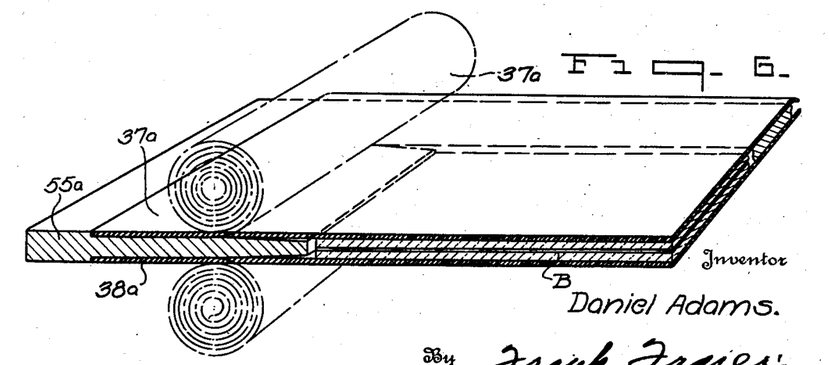
Fig. 6 is a perspective sectional view showing a somewhat modified form of arrangement.

The several laminations or layers of material to be joined are designated B and for the purpose of facilitating the placing thereof within the chamber C and their removal therefrom a frame member 55 such as shown in Fig. 5 may be utilized. This frame member is cut out to provide the opening 56 within which the assembled layers of material B are placed. The frame 55 with the assembled layers of material arranged therein is preferably placed initially upon a table or other suitable support 57 and the frame then pushed or forced into the chamber C by means of a suitable tool or the like. The sheets to be joined will of course be carried along with the frame so that the said sheets will be positioned within said chamber between the diaphragms 27 and 28 wherein they are adapted to be joined together preferably by the action of heat and pressure. Naturally, the frame is somewhat thinner than the assembled sheets so that it will not interfere with the proper uniting thereof. The lower diaphragm 28 preferably rests upon the longitudinally extending spaced ribs 18, 19 and 23 which serve to prevent the said diaphragm from sagging under the weight of the sheets and without preventing the application of pressure to the entire lower surface thereof.

After the assembled layers of material have been placed within the chamber C between the diaphragms 27 and 28 and prior to the application of any pressure thereto, the ends of such chamber are preferably closed by rotating the cores or valve elements 47 and 51 one-quarter of a revolution so that the slots 48 and 52 therein will be moved out of registry with the slots 49, 50 and 52, 53 respectively and will be caused to assume a vertical or substantially vertical position such as shown in Fig. 1. The rotation of core 47 is manually accomplished preferably by means of a handle or lever 59 connected therewith. It is desirable that the cores 47 and 51 at the opposite ends of the housing be rotated simultaneously and in a corresponding manner in order that the opposite ends of chamber C may be opened or closed at the same time. Accordingly, the cores 47 and 51 carry at corresponding ends thereof bevelled gears 60 and 61 meshing with correspondingly bevelled gears 62 and 63 keyed to the opposite ends of connecting shaft 64 journaled in bearings 65. Thus, upon rotation of core 47 and consequent opening or closing of chamber C at the forward end of the housing, the core 51 at the opposite end will be simultaneously and correspondingly rotated to open or close this end of said chamber.

The means for and the manner of circulating the oil or other liquid through the pressure chambers 16 and 17 will now be described in detail. As shown particularly in Figs. 2 and 4, there is provided at one side of housing A a vertically arranged inlet pipe 66 from which extend the two horizontal branch pipes 67 and 68, the upper branch pipe 67 being threaded or otherwise received within the upper section 10 of the housing while the lower branch pipe 68 is similarly received within the lower housing section 11. The lower branch pipe 68 communicates with a conduit 69 extending transversely within the lower housing section 11 and which conduit communicates with the compartments 20 and 25 of the pressure chambers 16 and 17 respectively through substantially vertical passages 70 and 71. The upper branch pipe 67 communicates with a transversely extending conduit 72 in the upper housing section 10 and which conduit communicates with the compartments 20 and 25 of the pressure chambers 16 and 17 in said upper section through passages 73 and 74.

Figure 4:
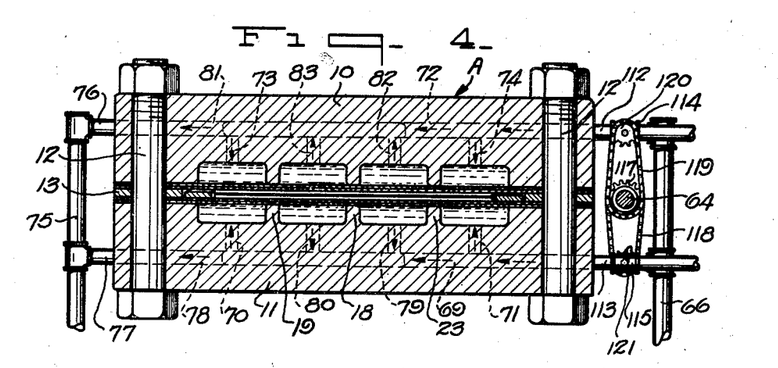
Fig. 4 is a transverse section taken substantially on line 4—4 of Fig. 2.

Arranged at the opposite side of housing A is an inlet pipe 75 having the horizontal branch pipes 76 and 77 which are threaded or otherwise received within the upper and lower sections 10 and 11 respectively of said housing. The lower outlet pipe 77 communicates with a transversely extending conduit 78 formed in the lower housing section 11 and which conduit communicates with the compartments 21 and 24 of pressure chambers 16 and 17 respectively through the substantially vertical openings 79 and 80. The upper outlet pipe 76 communicates with a similar conduit 81 in communication with the compartments 21 and 24 of the pressure chambers 16 and 17 respectively in the upper housing section 10 through passages 82 and 83. It will be noted that the inlet conduits 69 and 72 and the outlet conduits 78 and 81 are herein shown as being arranged at the forward end of the housing and further that the said outlet conduits are positioned adjacent to but slightly inwardly of said inlet conduits.

The oil or other liquid used is passed initially through the inlet pipe 66 and this liquid will then flow in equal volume through the inlet conduits 69 and 72 and then into the compartments 20 and 25 of the pressure chambers 16 and 17 respectively in both the lower and upper housing sections 10 and 11 through the passages 70, 71 and 73, 74 respectively. This liquid will then flow in the directions indicated by the arrows in Fig. 2 and will pass outwardly of the compartments 21 and 24 of pressure chambers 16 and 17. Thus, the liquid will flow outwardly through the passages 79, 80 and 82, 83 into the outlet conduits 78 and 81 respectively from which it will flow into the common outlet pipe 75. The liquid is thereby caused to flow longitudinally in opposite directions through the pressure chambers 16 and 17 above and beneath the diaphragms 27 and 28.

In accordance with the present invention, after the assembled layers of material B to be joined have been properly placed within the chamber C between the diaphragms 27 and 28 and the cores or valve elements 47 and 51 have been rotated to close the opposite ends thereof, the oil or other liquid used is adapted to be circulated through the pressure chambers above and beneath the said diaphragms, this oil being in a heated condition and circulated through the pressure chambers for a desired period of time necessary to cause a softening of the bonding material with which the adjacent faces of the sheets B have been previously coated after which the liquid is circulated in a heated condition and at relatively high pressure within said pressure chambers whereby to act upon the diaphragms and the assembled sheets of material therebetween to secure adhesion and effect the union thereof.

To accomplish the above, there is provided as shown most clearly in Fig. 1, a circulating or service pump 85 with which communicates one end of the inlet pipe 66. Also communicating with the service pump is a pipe 86 connected to one end of a coil 87, the other end of which is connected with the outlet pipe 75. The coil 87 is arranged within a heating tank 88, suitable means being provided for supplying a heating medium thereto and in the drawings there has been shown a steam pipe 89 having valve 90. The steam or other heating media employed is adapted to pass through the tank 88 around the coil 87 to effect a heating of the liquid contained therein and then outwardly of said tank through the exit pipe 91 containing valve 92. Upon operation of the service pump 85, the liquid will be forced through the inlet pipe 66 into the pressure chambers 16 and 17 above and beneath the diaphragms 27 and 28. The liquid will circulate through said pressure chambers in the manner above described and will pass outwardly thereof through the outlet pipe 75 and then through coil 87 and pipe 86 back to pump 85, thus completing the cycle. This heated liquid is then circulated between the service pump and pressure chambers for a period of time sufficient to soften and render plastic the bonding material and/or the layer of cellulose composition material interposed between the glass sheets.

The apparatus is also equipped with a high pressure pump 93 so that after the heated liquid has been circulated through the pressure chambers for a suitable period of time, the pressure pump can be brought into operation to circulate the liquid at a relatively high pressure within the pressure chambers. The pressure pump 93 is in communication with a source of liquid supply through pipe 94 and also communicates with pipe 86 through pipe 95 having valve 96. During the initial circulation of the liquid through the pressure chambers, the valve 96 is closed but when the pressure pump is started, this valve is opened so that the pressure pump 95 drawing liquid through pipe 94 will force the same through pipe 95, pipe 86, pump 85 and through the inlet pipe 66 into and through the pressure chambers creating therein a pressure sufficient to force the diaphragms 27 and 28 together to cause a uniting or joining of the assembled layers of material to form a composite sheet of unitary structure.

The heating tank 88 may also be provided with the two connections 97 and 98 having valves 99 and 100 whereby either hot or cold water may be circulated through the tank 88 around coil 87 if desired. When valves 99 and 100 are closed and valves 90 and 92 opened, the steam will pass through pipe 89 into the tank and around the coil to heat the liquid and the water of condensation will flow off by the pipe 91. If on the other hand valves 90 and 92 are closed and valves 99 and 100 opened either hot or cold water may be caused to enter at the bottom of the tank through connection 97 and fill it and flow out of the connection 98.

Figure 3:
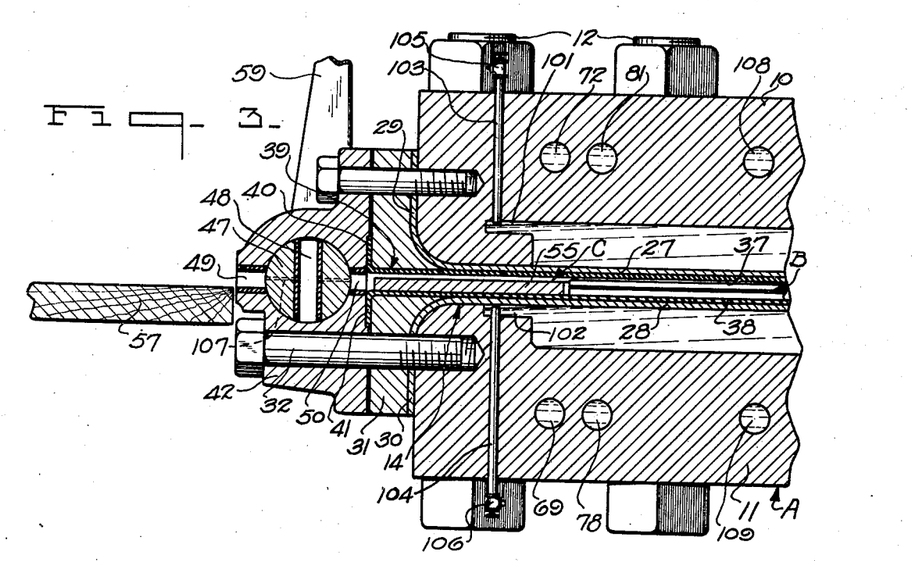
Fig. 3 is an enlarged longitudinal vertical section through the forward end of the housing.

It is desired, as indicated in Figs. 1 and 3, that the entire housing A be arranged on a slight incline or, otherwise stated, that its forward end be slightly higher than its rear end so that when filling the pressure chambers 16 and 17 with heated liquid, any air therein will be forced to the forward higher ends thereof. These chambers are preferably provided at their forward ends with transversely extending recesses 101 and 102 with which communicate a plurality of overflow pipes 103 and 104 carrying needle valves 105 and 106. Thus, these overflow pipes are located at the highest interior parts of the pressure chambers so that air may readily flow out of the chambers in the act of filling them.

Also, during the joining operation there will be a certain amount of air within the chamber C between the diaphragms 27 and 28 and when the said diaphragms are urged toward one another this air will ordinarily pass to the opposite ends of said chamber beyond the sheets being united. If desired however, either one or both of the rotatable cores 47 and 51 may be provided with an air hold 107 (see Fig. 3) to allow the air to pass outwardly therethrough.

It will be apparent that during the joining of the assembled layers of material, considerable pressure will be exerted upon the diaphragms 27 and 28 and this pressure may at times and after considerable use of the diaphragms cause a fracture or breaking thereof. It is impossible to determine just exactly when such a fracture might occur and consequently, it is desirable that means be provided for automatically relieving the pressure upon the diaphragms when the cores 47 and 51 are rotated and the opposite ends of chamber C opened so that the danger of heated liquid being expelled or ejected under high pressure through said chamber due to such a fracture of the diaphragms and thereby causing injury to the machine attendant or to parts of the apparatus will be reduced to a minimum if not entirely eliminated.

This is herein accomplished by providing within the upper and lower sections 10 and 11 of housing A the transverse conduits 108 and 109 communicating with the compartments 21 and 25 of the pressure chambers 16 and 17 respectively by passages 110 and 111. Threaded or otherwise received within the outer ends of conduits 108 and 109 are the relief pipes 112 and 113 having valves 114 and 115 respectively. The shaft 64 carries thereon a pair of sprockets 116 and 117 about which are trained sprocket chains 118 and 119 passing also about sprockets 120 and 121 respectively connected with and adapted to operate the valves 114 and 115. Thus, upon operation of the handle member 59 which causes rotation of the cores 47 and 51 to open or close the opposite ends of chamber C, the sprocket chains 118 and 119 will also be rotated to effect a corresponding opening or closing of valves 114 and 115. Consequently upon opening of the opposite ends of chamber C the valves 114 and 115 will be simultaneously opened to allow a certain amount of the liquid to pass outwardly through the relief pipes 112 and 113 thereby relieving the pressure upon the diaphragms 27 and 28. Upon rotation of the cores 47 and 51 to close the opposite ends of chamber C the valves 114 and 115 will be simultaneously closed so as to prevent the liquid from passing outwardly of the pressure chambers through the relief pipes.

It is not essential to the present invention that the rubber or rubber composition membranes 37 and 38 be permanently secured in position in the manner shown and above described. On the other hand, as shown particularly in Fig. 6, the membranes designated 37a and 38a may be secured at one of their ends to the frame 55a similar to the frame 55 shown in Fig. 5 and inserted into and removed therewith from the housing as will be apparent. The membranes are fastened at one end only and are adapted to be rolled or thrown back when it is desired to place the sheets of material to be united within the frame or to remove the finished composite sheet therefrom.

Briefly stated the operation of the apparatus above described is as follows: The circulating pump 85 and pressure pump 93 are normally idle and the valve 96 is closed. The handle member 59 is operated to rotate the cores 47 and 51 of valve members 42 and 46 so that the slots 48 and 52 assume a horizontal position whereupon the chamber C or the space between the diaphragms 27 and 28 will be accessible from opposite ends of the housing. The frame 55 may then be placed upon the support 57 and the sheets or layers of material placed within the opening 56 in properly assembled relation, the adjacent surfaces of the sheets being first coated with a suitable bonding material as desired. The frame 55 and assembled sheets of material are then pushed into the chamber C between diaphragms 27 and 28 through the forward end of the housing. After the sheets are properly positioned between the diaphragms the cores 47 and 51 are rotated to close the opposite ends of chamber C. The circulating pump 85 is then started and heated liquid is caused to circulate between the pump and the pressure chambers 16 and 17 for a desired period of time required to properly soften the bonding material and/or the interposed layer of non-brittle material. After the heated liquid has been circulated through the pressure chambers for the required period of time the valve 96 is opened and the pressure pump 93 brought into operation whereupon the liquid will be circulated through the chambers 16 and 17 under pressure thereby acting upon the diaphragms in such a manner as to cause a uniting of the sheets positioned therebetween. After the uniting of the sheets has been accomplished, the pressure pump 93 is put out of operation and the cores 47 and 51 of the valve members are rotated to open the opposite ends of chamber C so that the finished composite sheet may be removed therefrom and this is preferably accomplished by inserting a new set of sheets into the forward end of said chamber whereupon the finished composite sheet will be pushed outwardly through the opposite or rear end thereof. As the cores 47 and 51 are rotated to open the ends of chamber C the valves 114 and 115 in relief pipes 112 and 113 will be automatically opened to allow a portion of the liquid to flow therethrough thereby relieving the pressure upon the diaphragms. The circulating pump 85 can be maintained in operation at all times if desired or it can be started and stopped before and after the joining of each set of sheets.

Figure 7:
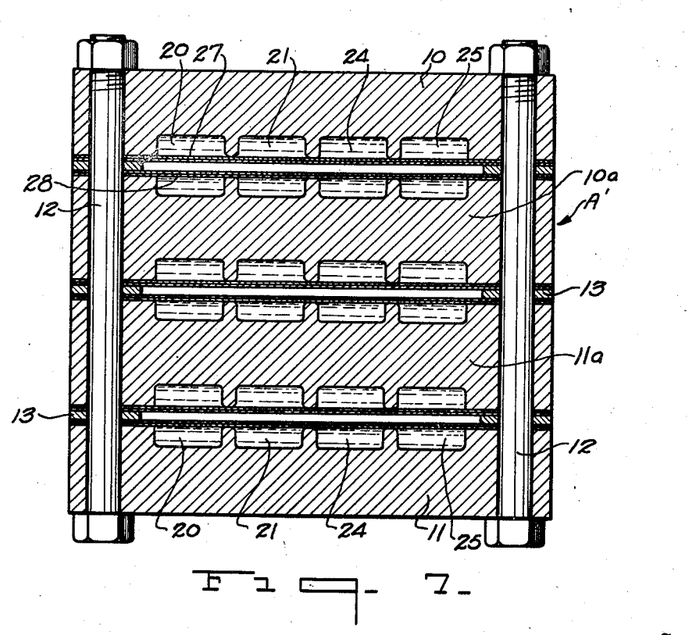
Fig. 7 is a vertical transverse section showing an apparatus for simultaneously producing a multiple heating and pressing operation.

In Fig. 7 is shown a type of apparatus wherein a multiple heating and pressing operation may be achieved to the end that a plurality of composite sheets may be simultaneously produced. The housing herein shown is designated in its entirety A' and interposed between the upper and lower sections 10 and 11 thereof are the intermediate sections 10a and 11a. The upper and lower sections of the housing are constructed in the same manner as above described and the intermediate sections are similarly constructed with the exception that each is provided with pressure chambers formed in both of the top and bottom thereof. A pair of diaphragms 27 and 28 is positioned between adjacent sections, being held spaced by means of the spacing strips 13. A set of sheets to be united is adapted to be placed between each pair of diaphragms and the heating and pressing operation is then carried out in the manner above described when only a single sheet is produced.

As brought out above one of the principal objects of the present invention is the provision of improved apparatus whereby the superimposed sheets or assembled layers of material to be joined may be placed therein and the finished composite sheet removed therefrom without the necessity of disturbing any part of the apparatus. This may also be accomplished by the use of the modified type of apparatus shown in Figs. 8 to 11 inclusive wherein the several sheets to be joined are assembled in a rubber bag or container arranged within a chamber or tank and exposed to hydraulic pressure.

Figure 8:
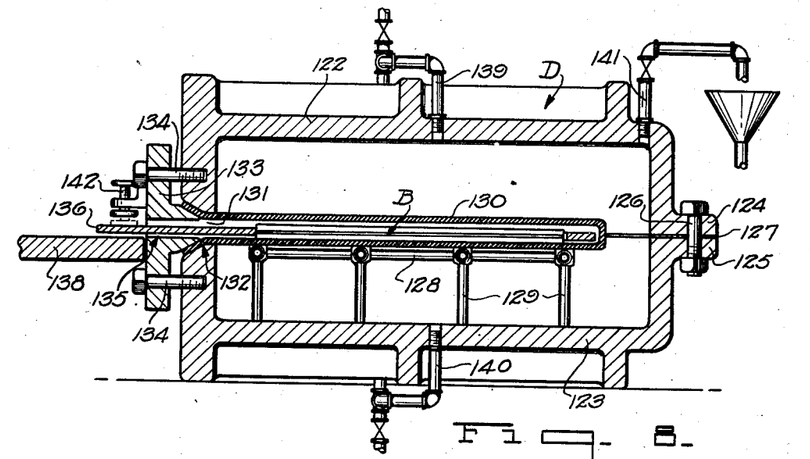
Fig. 8 is a vertical longitudinal section through a somewhat modified type of apparatus.
Figure 9:
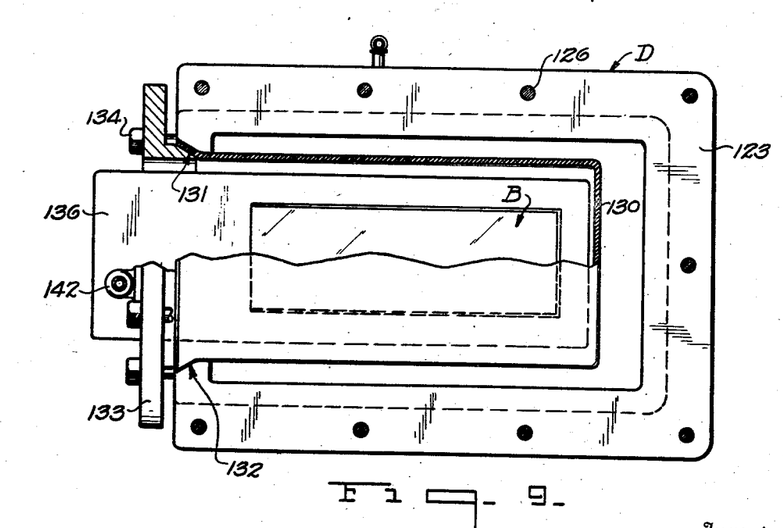
Fig. 9 is a top plan view thereof partially broken away.

In this form of the invention the pressure chamber is designated in its entirety by the letter D and consists of the upper and lower sections or portions 122 and 123 provided at their meeting edges with outwardly projecting flanges 124 and 125 secured together by bolts or the like 126. A suitable gasket or the like 127 may be arranged between said sections. Disposed within the pressure chamber is a horizontally arranged grill work or similar support 128 supported by legs 129. Within the pressure chamber is adapted to be placed one or more containers 130 for receiving the multiple glass sheets to be united.

Figure 11:
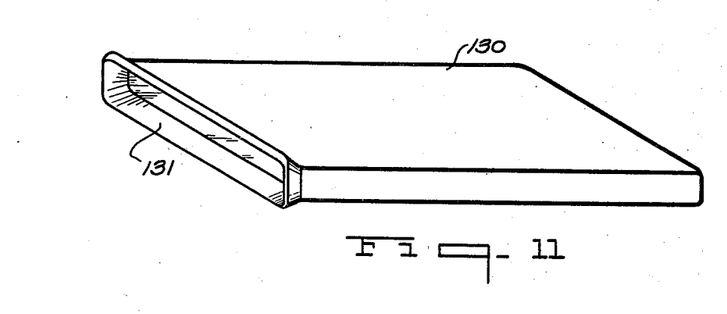
Fig. 11 is a perspective view of the flexible container or bag for receiving the assembled sheets to be joined.

The container 130 preferably comprises a seamless bag of rubber, rubber composition or some other suitable material and is provided with an open mouth 131. The open mouthed portion of the container projects through a slot 132 formed in the end wall of the pressure chamber and is clamped against the walls of said slot by means of clamping plate 133 secured in place by bolts or other suitable fastening means 134. The clamping plate 133 is also provided with a slot 135 adapted to register with slot 132 in end wall of the pressure chamber.

Figure 10:
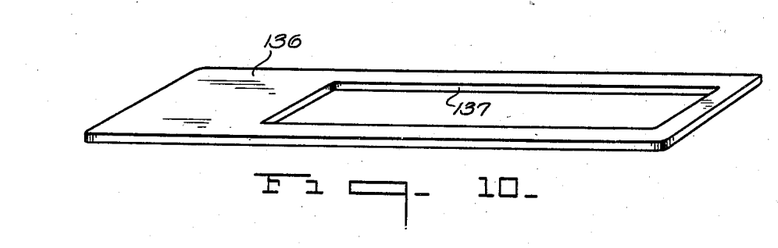
Fig. 10 is a perspective view of the sheet retaining frame member.

For the purpose of placing the assembled sheets of material within the container 130 and for removing the same therefrom after being united, a frame 136 shown in Fig. 10 may be utilized, this frame being of substantially the same construction as frame 55 shown in Fig. 5 and having an opening or cut-out portion 137 within which the assembled sheets are adapted to be placed. The frame 136 may be placed upon a support 138 and the assembled sheets of material placed therein after wh'ch the said frame and sheets are adapted to be pushed into container 130 through the open mouth 131 thereof. The oil or other liquid used for heating the bonding material and/or the layer of non-brittle material interposed between the glass sheets and for then effecting a uniting of the assembled sheets may be introduced into the pressure chamber through the connection 139 and passed outwardly thereof through connection 140. An overflow pipe 141 may be provided at one end of the pressure chamber. It will be noted that the container 130 is of such horizontal extent that the liquid can circulate above and beneath the same as well as at the sides and around the closed end thereof. In order to prevent the sheets from being forced outwardly of the container during the application of pressure thereto, a plurality of clamping members 142 may be provided. These members are preferably carried by the clamping plate 133 and are adapted to engage the frame 136 as shown by the dotted lines in Fig. 8.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for the manufacture of laminated glass, a housing for receiving the assembled layers of material to be joined, said housing being provided with openings in opposite walls thereof to allow said layers of material to be placed therein through one opening and removed therefrom through the opposite opening, means for applying pressure to the layers of material within the housing to effect the uniting thereof, and means for simultaneously opening and closing the openings in the opposite walls of said housing.

2. In apparatus for the manufacture of laminated glass, a housing for receiving the assembled layers of material to be joined, said housing having a continuous passage therethrough for receiving therein said layers of material, means for applying pressure to the layers of material within said passage to effect a uniting thereof, and means for simultaneously opening and closing the opposite ends of said passage.

3. In apparatus for the manufacture of laminated glass, a housing composed of upper and lower sections having chambers facing each other, a pair of flexible diaphragms between the sections forming closures for the chambers, means for maintaining the diaphragms spaced from one another, said diaphragms creating a chamber therebetween for receiving the assembled layers of material to be joined, means for circulating a liquid under pressure through the first mentioned chambers, means for opening and clos'ng the opposite ends of said second mentioned chamber, and means operable automatically upon opening of the ends of said second chamber to relieve the pressure within the first mentioned chambers.

4. In apparatus for the manufacture of laminated glass, a housing for receiving the assembled layers of material to be joined, said housing being provided with an opening through which said layers of material are inserted when placed therein, a movable closure for the opening, means for applying pressure to the layers of material within the housing to effect the uniting thereof, and means operable automatically to relieve the pressure within the housing upon actuation of the movable closure to open said opening.

5. In apparatus for the manufacture of laminated glass, a housing for receiving the assembled layers of material to be joined, said housing being provided with an opening through which said layers of material are inserted when placed therein, a rotatable valve for controlling the opening, means for applying pressure to the layers of material within the housing to effect the uniting thereof, means for actuating said valve, and means operable automatically to relieve the pressure within the housing upon operation of the valve to open said opening.

6. In apparatus for the manufacture of laminated glass, a housing for receiving the assembled layers of material to be joined, said housing being provided with openings in opposite walls thereof to allow said layers of material to be placed therein through one opening and removed therefrom through the opposite opening, rotatable members positioned in opposition to and constituting members for the openings, and means for rotating said members simultaneously to either open or close said openings.

7. In apparatus for the manufacture of laminated glass, a housing for receiving the assembled layers of material to be joined, said housing being provided with openings in opposite walls thereof to allow said layers of material to be placed therein through one opening and removed therefrom through the opposite opening, rotatable members positioned in opposition to and constituting closures for the openings, and means for rotating the members from a single control station to either open or close said openings.

8. In apparatus for the manufacture of laminated glass, a housing for receiving the assembled layers of material to be joined, said housing being provided with openings in opposite walls thereof to allow said layers of material to be placed therein through one opening and removed therefrom through the opposite opening, rotatable members positioned in opposition to and constituting closures for the openings and a common control means for rotating said members to either open or close said openings.

9. In apparatus for the manufacture of laminated glass, a housing for receiving the assembled layers of material to be joined, said housing being provided with openings in opposite walls thereof to allow said layers of material to be placed therein through one opening and removed therefrom through the opposite opening, movable closures for the openings, means for applying pressure to the layers of material within the housing to effect the uniting thereof, means for actuating the movable closures simultaneously, and means operable automatically to relieve the pressure within the housing upon operation of the movable closures to open said openings.

10. In apparatus for the manufacture of laminated glass, a housing for receiving the assembled layers of material to be joined, said housing being provided with openings in opposite walls thereof to allow said layers of material to be placed therein through one opening and removed therefrom through the opposite opening, rotatable means for controlling each opening respectively, means for applying pressure to the layers of material within the housing to effect the uniting thereof, means for operating said rotatable means to simultaneously open and close the openings in the opposite walls of the housing, and means operable automatically to relieve the pressure within the housing upon opening of the said openings.

Signed at Toledo, in the county of Lucas and State of Ohio, this 9th day of February, 1928.

DANIEL ADAMS.

CERTIFICATE OF CORRECTION.

Patent No. 1,860,067.                                       May 24, 1932.

DANIEL ADAMS.

It is hereby certified that error appears in the printed specification of the above numbered patent requiring correction as follows: Page 8, lines 16 and 17, claim 6, for "members" read closures, and line 31, claim 7, for "of" read or; and that the said Letters Patent should be read with these corrections therein that the same may conform to the record of the case in the Patent Office.

Signed and sealed this 5th day of July, A. D. 1932.

(Seal)                                                       M. J. Moore,
                                                              Acting Commissioner of Patents.